US008745353B2

(12) United States Patent
Feldman et al.

(10) Patent No.: US 8,745,353 B2
(45) Date of Patent: Jun. 3, 2014

(54) BLOCK BOUNDARY RESOLUTION FOR MISMATCHED LOGICAL AND PHYSICAL BLOCK SIZES

(75) Inventors: Timothy R. Feldman, Louisville, CO (US); Wayne H. Vinson, Longmont, CO (US); Jonathan W. Haines, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 680 days.

(21) Appl. No.: 12/604,889

(22) Filed: Oct. 23, 2009

(65) Prior Publication Data

US 2011/0099350 A1    Apr. 28, 2011

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl.
USPC .......................................... 711/170; 711/202

(58) Field of Classification Search
None
See application file for complete search history.

(56) References Cited

U.S. PATENT DOCUMENTS

| | | | |
|---|---|---|---|
| 5,630,093 A | 5/1997 | Holzhammer et al. | |
| 5,905,993 A | 5/1999 | Shinohara | |
| 6,018,778 A | 1/2000 | Stolowitz | |
| 6,441,427 B1 | 8/2002 | Yamada et al. | |
| 6,934,804 B2 | 8/2005 | Hashemi | |
| 7,073,010 B2 | 7/2006 | Chen | |
| 7,493,450 B2 | 2/2009 | Bearden | |
| 7,529,905 B2 | 5/2009 | Sinclair | |
| 2004/0210708 A1 | 10/2004 | Conley | |
| 2006/0005069 A1 | 1/2006 | Gaertner | |
| 2007/0086260 A1* | 4/2007 | Sinclair | 365/230.03 |
| 2007/0186032 A1 | 8/2007 | Sinclair et al. | |
| 2008/0037321 A1 | 2/2008 | Luo et al. | |
| 2008/0155227 A1 | 6/2008 | Sinclair et al. | |
| 2008/0168069 A1 | 7/2008 | Chang et al. | |
| 2008/0228992 A1 | 9/2008 | Dumitru et al. | |
| 2010/0024642 A1 | 2/2010 | Friendshuh et al. | |
| 2011/0099321 A1 | 4/2011 | Feldman et al. | |
| 2011/0219178 A1 | 9/2011 | Eggleston et al. | |

FOREIGN PATENT DOCUMENTS

WO    WO 93/00635    *  1/1993

OTHER PUBLICATIONS

Kjelsø et al., Memory Management in Flash-Memory Disks with Data Compression, 1995, Springer-Verlag, 16 pages.*

(Continued)

*Primary Examiner* — April Y Blair
*Assistant Examiner* — Gary W Cygiel
(74) *Attorney, Agent, or Firm* — Hollingsworth Davis, LLC

(57) ABSTRACT

The present disclosure describes various techniques resolving block boundary issues and reconstructing logical blocks in a block access storage device when there are resulting mismatches between logical and physical block sizes or alignments, such that logical blocks span multiple physical block boundaries in irregular ways. In one example, a method comprises the following features: receiving logical block addresses that are associated with a sequence of logical blocks; and locating a first portion of a logical block within a first physical block that is stored in a block access storage device based upon a logical block address of the logical block, wherein the logical block is part of the sequence of logical blocks, and wherein at least two logical blocks within the sequence of logical blocks have different sizes.

32 Claims, 11 Drawing Sheets

(56) References Cited

OTHER PUBLICATIONS

U.S. Appl. No. 12/604,842, entitled "Enabling Spanning for a Storage Device," filed Oct. 23, 2009.

U.S. Appl. No. 12/568,729, filed Sep. 29, 2009, entitled "Data Stripes and Addressing for Flash Memory Devices".
File history for U.S. Appl. No. 12/604,842.

* cited by examiner

| LOGICAL BLOCK | PHYSICAL BLOCK | NEXT PHYSICAL BLOCK |
|---|---|---|
| 0 | 0 | 0 |
| 1 | 0 | 1 |
| 2 | 1 | 1 |
| 3 | 1 | 1 |
| 4 | 1 | 2 |
| 5 | 2 | 2 |
| 6 | 2 | 2 |
| 7 | 2 | 3 |

FIG. 9

BLOCK BOUNDARY RESOLUTION FOR MISMATCHED LOGICAL AND PHYSICAL BLOCK SIZES

TECHNICAL FIELD

This disclosure relates to the processing of data within a block access storage device, such as a solid-state drive.

BACKGROUND

Block access storage devices typically store blocks of data on a selected physical media. Disc drive interfaces typically use fixed-length logical block sizes, such as a size of 512 bytes. These types of interfaces may be used by disc drives, solid-state drives, hybrid (disc and solid-state) drives, and other storage devices. Tape drive interfaces use fixed or variable length logical block sizes. The logical blocks may be compressed, as is common in tape drives. Meanwhile, encoding methods or redundant information, such as error-correcting codes, may add to the information recorded for a logical block. Block access storage devices typically transform the logical blocks received from the host to different logical blocks to be stored by encoding, adding redundancy, grouping and/or compressing. The transformed logical blocks typically have a transformed logical block address that is a transformation of the logical block address used at the host interface.

The atomic unit of write access in a block access storage device is a physical block. The physical media may support variable physical block lengths, as with common tape formats. More typically, the media has a fixed-length physical block size. Disc drive design usually matches the physical block size to the logical block size plus the size of the added information. Some designs have larger physical blocks that accommodate an integral number of logical blocks. Flash designs typically include physical blocks called pages that have space for a number of logical blocks plus a certain amount of added information.

SUMMARY

The present disclosure describes various techniques resolving block boundary issues and reconstructing logical blocks in a block access storage device (e.g., solid-state drive) when there are resulting mismatches between logical and physical block sizes, such that logical blocks span physical block boundaries in irregular ways. Certain techniques provide for locating the ending of a logical block when it spans physical blocks, and also for locating the beginning of a logical block within a given physical block. As noted above, block access storage devices may transform the logical blocks received from the host to different logical blocks to be stored by encoding, adding redundancy, grouping and/or compressing. The transformed logical blocks may have a transformed logical block address that is a transformation of the logical block address used at the host interface. This disclosure relates to these transformed logical blocks and their transformed logical block addresses.

In one example, a method comprises the following features: receiving logical block addresses that are associated with a sequence of logical blocks; and locating a first portion of a logical block within a first physical block that is stored in a block access storage device based upon a logical block address of the logical block, wherein the logical block is part of the sequence of logical blocks, and wherein at least two logical blocks within the sequence of logical blocks have different sizes.

In one example, a device comprises one or more processors and a locater module. The locater module is configured in the one or more processors to receive logical block addresses that are associated with a sequence of logical blocks, and to locate a first portion of a logical block within a first physical block that is stored in a block access storage device based upon a logical block address of the logical block, wherein the logical block is part of the sequence of logical blocks, and wherein at least two logical blocks within the sequence of logical blocks have different sizes In one example, a computer-readable storage medium comprises executable instructions that cause one or more processors to perform the following acts: receive logical block addresses that are associated with a sequence of logical blocks; and locate a first portion of a logical block within a first physical block that is stored in a block access storage device based upon a logical block address of the logical block, wherein the logical block is part of the sequence of logical blocks, and wherein at least two logical blocks within the sequence of logical blocks have different sizes.

In one example, a system comprises a computing device comprising one or more processors, a block access storage device coupled to the computing device, and a block boundary resolution module comprising a locater module. The locater module is configured in the one or more processors of the computing device to receive logical block addresses that are associated with a sequence of logical blocks, and to locate a first portion of a logical block within a first physical block that is stored in the block access storage device based upon a logical block address of the logical block, wherein the logical block is part of the sequence of logical blocks, and wherein at least two logical blocks within the sequence of logical blocks have different sizes.

The details of one or more aspects are set forth in the accompanying drawings and the description below. Other features, objects, and advantages will be apparent from the description and drawings, and from the claims.

BRIEF DESCRIPTION OF DRAWINGS

FIG. 9 is a diagram illustrating an example of a map that specifies a next physical block for each physical block in a progression that is assigned to a sequence of logical blocks.

DETAILED DESCRIPTION

Figure 1:
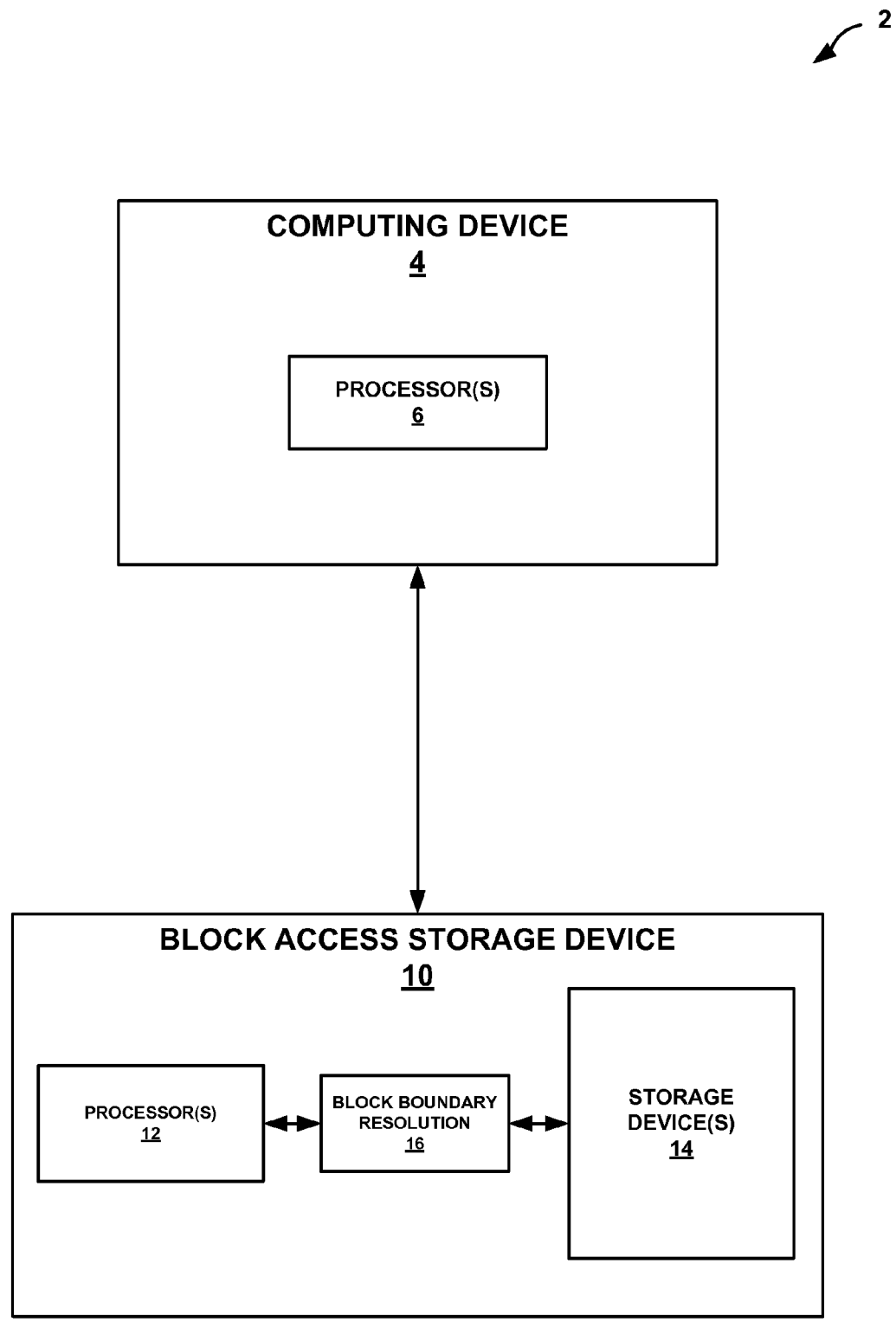
FIG. 1 is a block diagram illustrating an example system that includes a computing device coupled to a block access storage device, where the block access storage device includes one or more storage devices that perform block boundary resolution.

A block access storage device, such as a solid-state drive, is typically coupled to, and interfaces with, a computing device. The computing device typically manages data using logical blocks, while the block access storage device typically manages data using physical blocks in its physical media. A controller in the block access storage device is capable of mapping between logical blocks and physical blocks.

As long as each physical block stores an integral number of logical blocks, or an integral number of physical blocks are used to store each logical block, the logical block boundaries coincide with physical block boundaries. In these cases, the information needed to map between logical and physical blocks may be well bounded, as only the offset into a block is needed in addition to the block address.

Some markets may desire a variety of logical block sizes beyond the nominal 512 bytes. Others are well served by storage of compressed data if the physical medium of the block access storage device can be well managed to take advantage of the compression. Compression often transforms the information into varying data sizes thus making the logical blocks effectively varied-length and often not aligning to the boundaries of fixed-length physical blocks. In addition, in some instances, multiple logical blocks may be compressed together into a "compression unit" that may also need to be handled similar to a logical block. Any given compression unit may include one or more logical blocks, such that compression units in general may include varying numbers of logical blocks. In some cases, a logical block may be interpreted as a compression unit, which may include one or more logical blocks included therein.

To support these variations in the amount of information stored per logical block in an efficient manner, a variable number of logical blocks per physical block may be desirable. More specifically, some logical blocks may span physical block boundaries in irregular ways, thus requiring resolution of the handling of the block boundaries. In some cases, a logical block may span across more than one physical block boundary (e.g., when a logical block comprises a "compression unit" that includes multiple logical blocks that have been compressed into the compression unit).

In particular, advanced solid-state drives and some disc drives have dynamic logical-to-physical mapping which can efficiently handle a variety of logical block sizes while also taking advantage of compression despite the resulting variation in the size of the information to be stored. These systems may, in some cases, be optimized if they have good methods of resolving block boundaries on the resulting mismatch between logical and physical block sizes.

In order to resolve block boundary issues, a controller may provide various characteristics. For example, a block boundary resolution module may specify a default progression in which physical blocks are assigned to a sequence of logical blocks. This module may determine the location of at least the first logical block for a sequence of logical blocks. In some instances, the module may store and retrieve information specifying a progression of physical blocks if the progression used is not the primary default progression. The module may also locate logical blocks other than the first of a continuous sequence, particularly if they can have varying sizes or if they are partitioned between multiple different physical blocks.

FIG. 1 is a block diagram illustrating an example system 2 that includes a computing device 4 coupled to a block access storage device 10, where block access storage device 10 includes one or more storage devices 14 in which block boundary resolution 16 is performed, as will be described in further detail below.

As shown in FIG. 1, computing device 4 includes one or more processors 6. Computing device 4 may comprise a stand-alone device or may be part of a larger system. For example, computing device 4 may comprise, or be part of, a personal computer, a wireless communication device (such as a wireless mobile handset), a digital camera, a personal digital assistant (PDA), or a laptop device, to name only a few, non-exhaustive examples. Processors 6 may comprise one or more of a general purpose microprocessor, digital signal processor (DSP), application specific integrated circuit (ASIC), field programmable gate array (FPGA), programmable logic devices (PLDs), or other equivalent logic device. Computing device 4 is communicatively coupled to block access storage device 10.

Block access storage device 10 is capable of storing and retrieving blocks of data, as will be described in much further detail below. In one embodiment, block access storage device 10 may comprise a solid-state drive (SSD). In other embodiments, block access storage device 10 may comprise a disc drive or a tape drive.

In the example of FIG. 1, block access storage device 10 includes one or more processors 12 and one or more storage devices 14. Processors 12 may provide control functionality for block access storage device 10, and may include one or more of a general purpose microprocessor, digital signal processor (DSP), application specific integrated circuit (ASIC), field programmable gate array (FPGA), programmable logic devices (PLDs), or other equivalent logic device.

Storage devices 14 may comprise one or more computer-readable storage media. A computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, and/or magnetic or optical data storage media, to name a few.

For example, storage devices 14 may include volatile and/or non-volatile memory contained in one or more semiconductor chips. The non-volatile memory may, in some cases, comprise flash memory (e.g., NAND flash, NOR flash). Block access storage device 10 may store blocks of data within storage devices 14.

During operation, computing device 4 may communicate with block access storage device 10. For example, computing device 4 may request that certain data be stored within storage devices 14 of block access storage device 10. In many instances, the data provided by computing device 4 to block access storage device 10 may be included within one or more logical blocks. Block access storage device 10 may store these logical blocks within one or more physical blocks within storage devices 14. (In flash designs, these physical blocks may be called pages.)

As long as each physical block stores an integral number of logical blocks, the logical block boundaries coincide with physical block boundaries. However, block boundary resolution 16 helps resolve block boundary issues when there are resulting mismatches between logical and physical block sizes, such that logical blocks span multiple physical block boundaries in irregular ways. Block boundary resolution 16 may locate the end of a logical block when it is partitioned between multiple physical blocks, or locate the beginning of a logical block within a given physical block. In the example of FIG. 1, processors 12 may be implemented within block access storage device 10 to control block boundary resolution 16 within storage devices 14.

Block boundary resolution 16 may be configured within processors 12 to perform various acts, and may comprise one or more hardware, software, firmware, or any combination thereof. In one example scenario, block boundary resolution 16 may include receiving logical block addresses from computing device 4 that are associated with a sequence of logical blocks, and locating a first portion (e.g., beginning) of a logical block within a first physical block that is stored in storage devices 14 of block access storage device based upon a logical block address (LBA) of the logical block, the logical block being part of the sequence of logical blocks. At least two logical blocks within the sequence of logical blocks may have different sizes. In such fashion, block boundary resolution module 16 may be able to find the start, or beginning portion, of a logical block within a given physical block.

Block boundary resolution 16 may further include determining that the logical block is partitioned between the first physical block and a second, different physical block that is also stored in storage devices 14 of block access storage device 10, where the first physical block and the second physical block are part of a progression of physical blocks assigned to the sequence of logical blocks, and locating a second portion of the logical block within the second physical block. In such fashion, block boundary resolution 16 may resolve block boundary issues when there are resulting mismatches between logical and physical block sizes.

Figure 2:
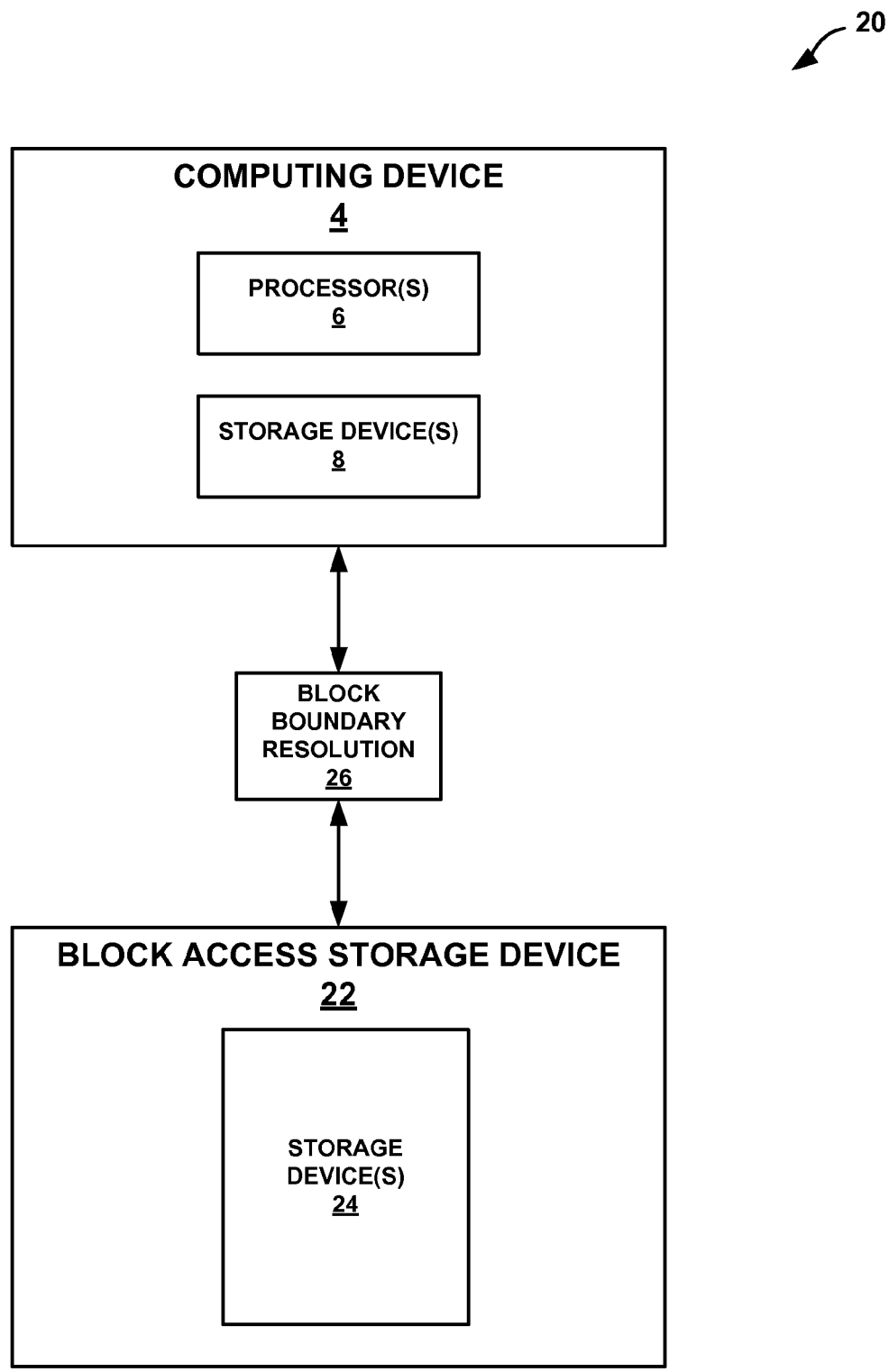
FIG. 2 is a block diagram illustrating another example system that includes a computing device coupled to a block access storage device, where the block access storage device includes one or more storage devices that perform block boundary resolution.

FIG. 2 is a block diagram illustrating another example system 20 that includes computing device 4 coupled to a block access storage device 22, where the block access storage device 22 includes one or more storage devices 24 in which block boundary resolution 26 is performed. System 20 is similar to system 2 shown in FIG. 1, in that each system includes computing device 4 coupled to one of block access storage devices 10 or 22. Each of block access storage devices 10 and 22 include corresponding storage devices 14 and 24, respectively. Block boundary resolution 26 may be configured within processors 6 to perform various acts, and may comprise one or more hardware, software, firmware, or other modules. For example, block boundary resolution 26 may be executed as part of a software driver that controls operation of block access storage device 22.

In FIG. 2, however, processors 6 of computing device 4 may control block boundary resolution 26 within storage devices 24 via commands or instructions that are sent from computing device 4 to block access storage device 22. In FIG. 1, processors 12 directly within block access storage device 10 may control block boundary resolution 16 within storage devices 14.

Figure 3:
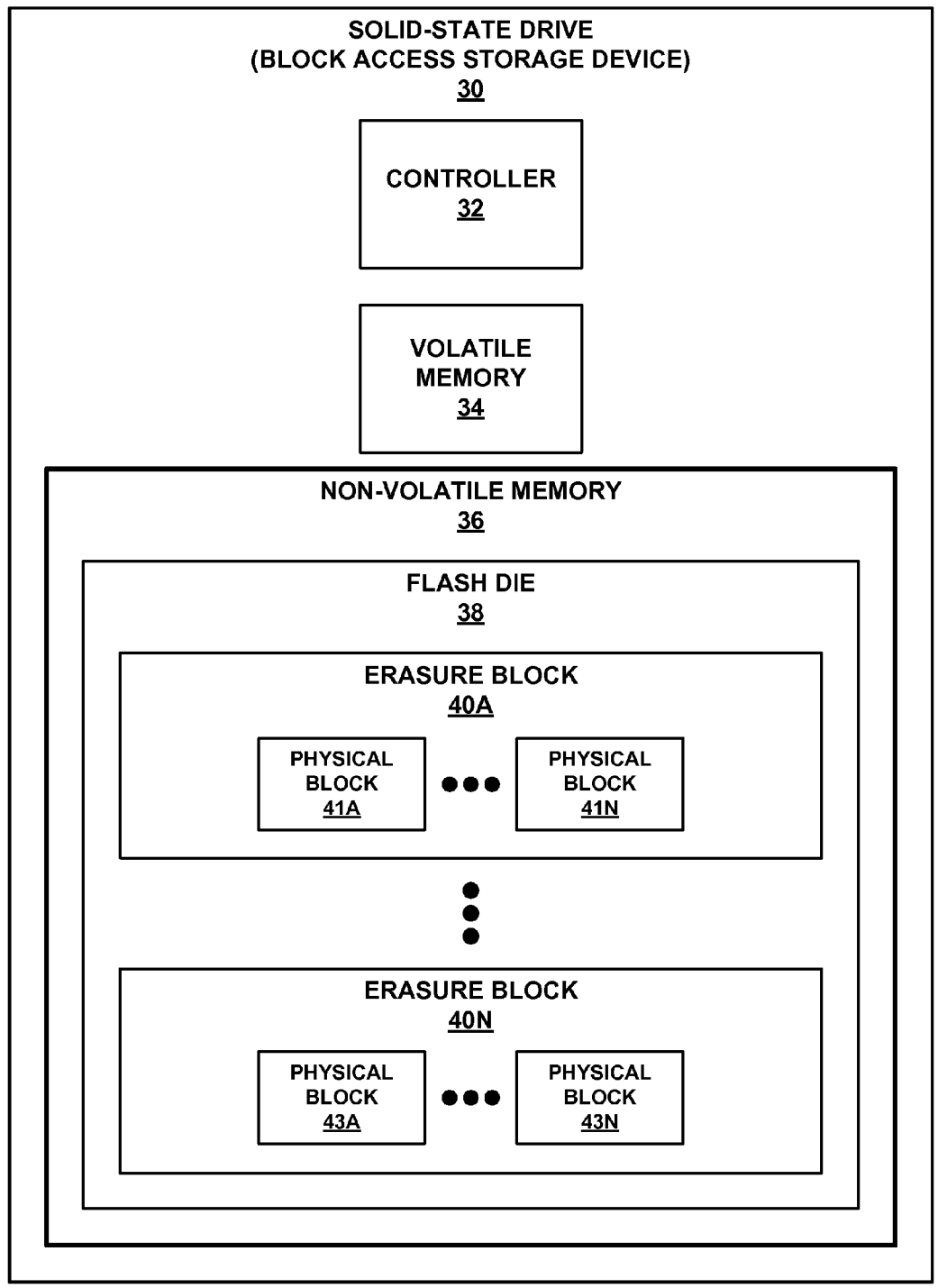
FIG. 3 is a block diagram illustrating an example of a block access storage device comprising a solid-state drive that includes one or more erasure blocks.

FIG. 3 is a block diagram illustrating an example of a block access storage device comprising a solid-state drive (SSD) 30 that includes one or more erasure blocks. In the example of FIG. 3, SSD 30 may be an example embodiment of block access storage device 10 shown in FIG. 1 or block access storage device 22 shown in FIG. 2. FIG. 3 provides just one non-limiting example of a block access storage device. Many other examples are also contemplated to be within the scope of the present invention.

SSD 30 includes a controller 32, volatile memory 34, and non-volatile memory 36. Controller 32 may be part of or configured within processors 12 shown in FIG. 1, according to one embodiment. In those examples in which a storage device does not include processors, such as block access storage device 22 shown in FIG. 2, controller 32 may be part of or configured within one or more processors of a computing device, such as processors 6 shown in FIG. 2.

Volatile memory 34 and non-volatile memory 36 may be included within storage devices 14 shown in FIG. 1, according to one embodiment. Controller 32 may control the storage and access of data within both volatile memory 34 and non-volatile memory 36.

In the example of FIG. 3, non-volatile memory 36 includes flash die 38, which may comprise one or more semiconductor chips. In some cases, non-volatile memory 36 may include one or more flash die.

Flash die 36 includes one or more erasure blocks 40A-40N. Each erasure block 40A-40N includes one or more physical blocks of data. For instance, erasure block 40A includes physical blocks 41A-41N, and erasure block 40N includes physical blocks 43A-43N. Each physical block may contain one or more logical blocks of data that may be provided from an external computing device, such as computing device 4 (FIGS. 1 and 2).

In some instances, before writing data to a physical block, controller 32 may write the data to volatile memory 34. Controller 32 may accumulate a full physical block of data in volatile memory 34 before writing the physical block to non-volatile memory 36. As controller 32 receives logical blocks to be stored from a host (e.g., computing device 4), controller 32 writes the received logical blocks to volatile memory 34. In some examples, controller 32 may also compress the data in volatile memory 34.

Figure 4A:
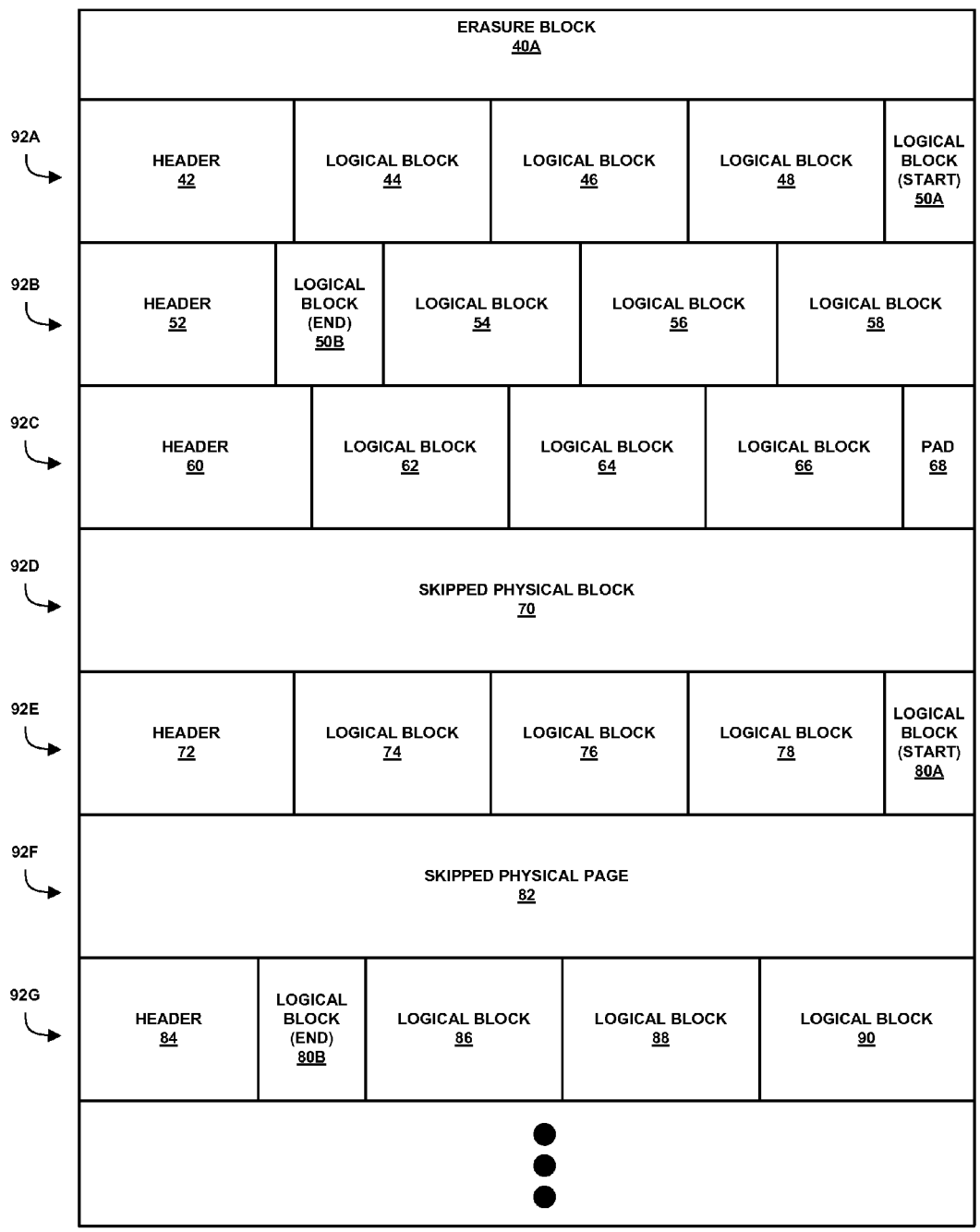
FIG. 4A is a block diagram illustrating an example of an erasure block that includes multiple physical blocks each having a header.

FIG. 4A is a block diagram illustrating an example of an erasure block 40A that includes multiple physical blocks each having a header. FIG. 4A shows the example erasure block 40A. However, any of the erasure blocks, such as erasure blocks 40B-40N shown in FIG. 3, may have a similar structure.

In the example of FIG. 4A, erasure block 40A comprises a plurality of physical blocks 92A-92G (physical blocks 92). Although seven physical blocks are shown in FIG. 4A, it should be understood that an erasure block may comprise any number of physical blocks. Each of logical blocks 44-88 may include data received from a host computing device.

Each of physical blocks 92 generally includes a header portion and a stored data portion. Physical block 92A, for example, includes header 42 and logical blocks 44-48. Physical block 92B includes header 52 and logical blocks 54-58, physical block 92C includes header 60 and logical blocks 62-66, physical block 92E includes header 72 and logical blocks 74-78, and physical block 92G includes header 84 and logical blocks 86-88. Physical block 92A also includes logical block part 50A, which corresponds to a start or a first portion of a complete logical block. Physical block 92B includes a logical block part 50B, which corresponds to an end or a second, remaining portion of the complete logical block. In this manner, logical block parts 50A and 50B represents a logical block that spanned physical block 92A and physical block 92B. A logical block that spans multiple physical blocks may also be referred to as a spanning logical block. The logical block comprising the union of logical block parts 50A and 50B represents a logical block for which an SSD controller, such as controller 32 (FIG. 3) determined spanning was appropriate.

In some examples, controller 12 may also write a location identifier to header 42 that identifies the location of logical block part 50B corresponding to logical block part 50A. In some examples, controller 12 also writes a location identifier to header 52 of page 92B that indicates the "parent" physical block for logical block part 50B. Accordingly, when a physical block includes both a second, remaining portion of a logical block at the beginning of the physical block and a first portion of a logical block at the end of the physical block, a header corresponding to the physical block may include two location identifiers, one to identify a previous physical block from which spanning occurred, and another to identify a next physical block to which a spanning logical block has been written. In some examples, controller 32 writes a location identifier in headers of each of physical blocks 92 that include a spanning logical block, e.g., physical blocks 92A and 92B in the example of FIG. 4A.

Physical block 92C, on the other hand, includes logical blocks 62-66 and padding (pad) 68. Padding 68 represents a portion of physical block 92C that is unused, e.g., includes data unrelated to a particular logical block. In some examples, controller 32 may explicitly writes zeros or some other selected data pattern to padding 68. In other examples, controller 32 may leaves any data currently in the bits corresponding to padding 68. Accordingly, physical block 92C represents a physical block for which controller 12 determined not to utilize spanning.

Controller 12 may skip some physical blocks, such as skipped physical blocks 70 and 82 (physical blocks 92D, 92F), for various reasons. For example, data may already exist in these physical blocks or the physical blocks may be unwriteable due to an error. In the example of FIG. 4A, physical block 92E includes logical block part 80A, which spans into (as logical block part 80B) physical block 92G, which is not the immediately next available physical block (that is, physical block 92F). Accordingly, in some examples, controller 12 may write a location identifier in header 72 that identifies physical block 92G as the physical block containing logical block part 80B.

In this manner, erasure block 40A represents an erasure block for which spanning has been enabled in at least some physical blocks. That is, erasure block 40A includes physical blocks, such as physical block 92A, that store a plurality of logical blocks, wherein a size of the plurality of logical blocks exceeds a size of physical block 92A, so a first partition of one of the plurality of logical blocks is stored in physical block 92A, and a second partition of the one of the plurality of logical blocks is stored in a second, different physical block (e.g., physical block 92B). In other examples, a second partition of a logical block may be stored in a physical block of a different erasure block or even a different flash die.

Figure 4B:
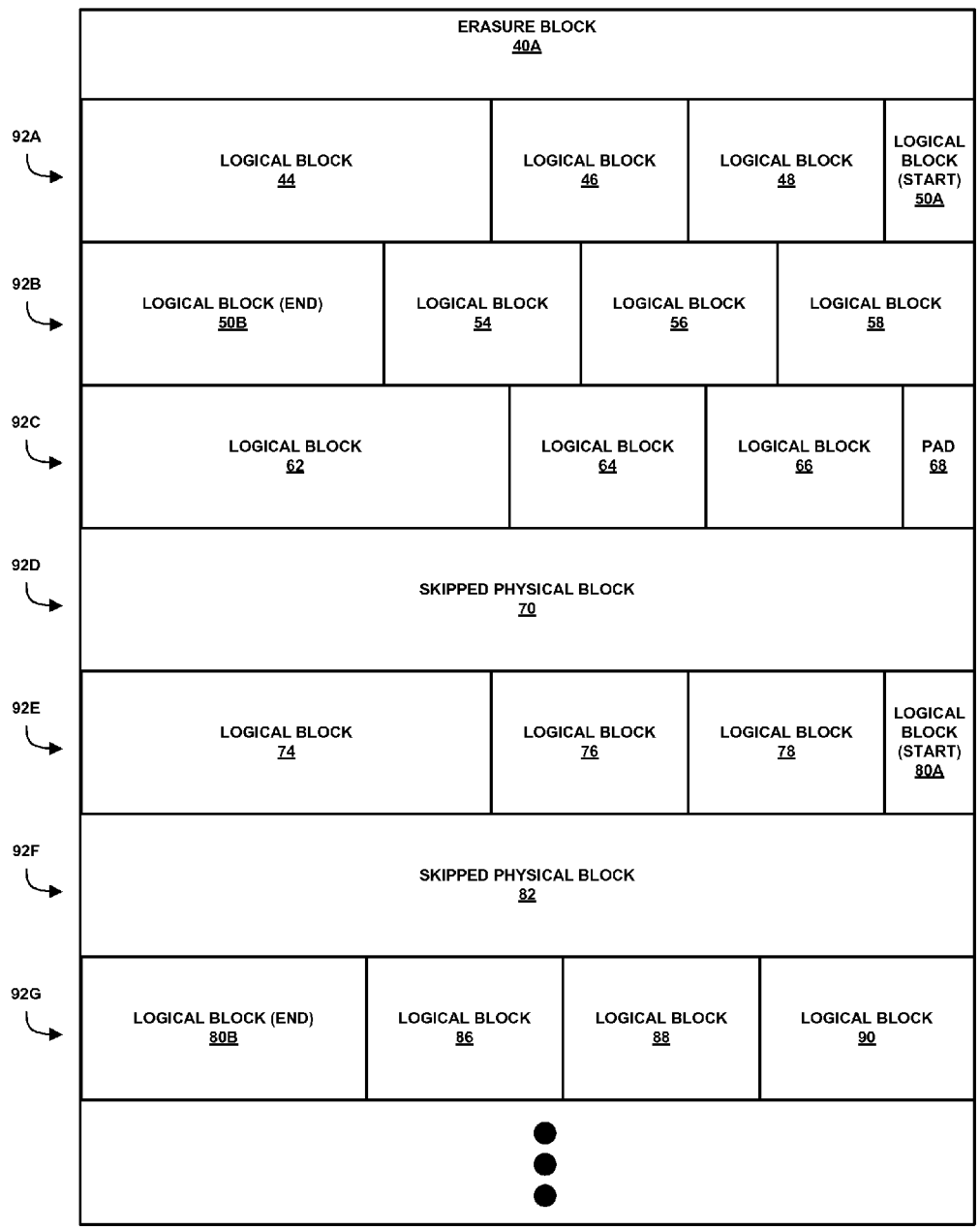
FIG. 4B is a block diagram illustrating an example of an erasure block that includes multiple physical blocks without headers.

FIG. 4B is a block diagram illustrating another example of an erasure block that includes multiple physical blocks without headers. In FIG. 4B, another example of erasure block 40A is provided. Erasure block 40A shown in FIG. 4B again includes physical blocks 92A-92G, and each physical block may include one or more portions of one or more logical blocks, similar to the example of FIG. 4A. However, in the example of FIG. 4B, the physical blocks 92A-92G do not include header information (e.g., headers 42, 52, 60, 72, and 84 shown in the example of FIG. 4A).

In the example of FIG. 4B, the information contained within headers 42, 52, 60, 72, and 84 (shown in FIG. 4A) is not embedded within physical blocks 92A-92G. Instead, this information may be stored separate from physical blocks 92A-92G (e.g., in different physical blocks within erasure block 40A or another erasure block). In some cases, this information may be stored as system metadata within a metadata storage area of solid-state drive 30. This information may then be accessed during processing of the logical blocks contained within physical blocks 92A-92G.

Figure 5:
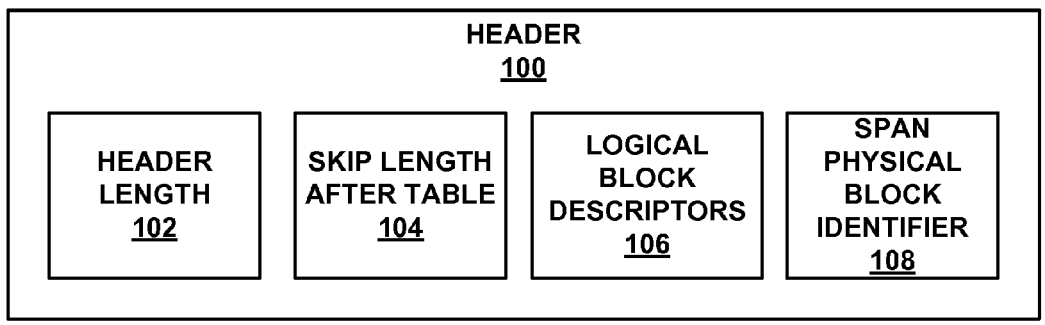
FIG. 5 is a block diagram illustrating an example of a header.

FIG. 5 is a block diagram illustrating an example header 100 that may correspond to any of headers 42, 52, 60, 72, or 84 (FIG. 4A). Header 100 includes header length value 102, skip length after table value 104, logical block descriptors 106, and span physical block identifier 108. Header length value 102 describes the length of header 100, e.g., in bytes. Controller 32 may use header length value 102 to determine where in the corresponding physical block that the logical block data begin.

Skip length after table value 104 generally describes the length of any portion of a spanning logical block in the physical block corresponding to header 100. In this manner, controller 32 may identify the starting point of a logical block that starts in the physical block corresponding to header 100 by adding the values of header length 102 and skip length after table 104. In the example of FIG. 4A, with respect to physical block 92B, header length value 102 would describe the length of header 52, and skip length after table value 104 would describe the length of logical block portion 50B. Accordingly, controller 32 could add the values of header length value 102 and skip length after table value 104 to identify the starting point of logical block 54, with respect to the example of physical block 92B. When no spanning logical block portion is present in the corresponding physical block, controller 32 may set the value of skip length after table 104 to zero.

Logical block descriptors 106 generally describe the logical blocks that are present in the physical block corresponding to header 100. Logical block descriptors 106 generally include a list of LBAs and lengths of the logical blocks. Controller 32 may use logical block lengths to determine where in a corresponding physical block the logical block data begin. In some examples, when a logical block of the physical block spans into another physical block, logical block descriptors 106 will include an entry for the logical block specifying where in the logical block the physical block boundary or boundaries occur. In some examples, when a portion of a logical block in the physical block has been spanned into from another physical block, logical block descriptors 106 will not include an entry for the spanning logical block.

With respect to FIG. 4A, for example, header 42 may include logical block descriptors for logical blocks 44, 46, 48, and 50, while header 52 may include logical block descriptors for logical blocks 54, 56, and 58 (but not 50). In other examples, logical block descriptors 106 may include entries for any logical block or logical block portion occurring in the physical block corresponding to header 100, even when the logical block portion is spanned from another physical block. In still other examples, logical block descriptors 106 may include a predetermined value that represents the presence of a remaining portion of a spanning logical block in the physical block corresponding to header 100 preceding the data for the first logical block specified by logical block descriptors 106. Logical block descriptors 106 may include entries for all logical blocks that have even a portion of their data in the physical block corresponding to header 100, in which case the skip length after table 104 value is not needed.

Optionally, logical block descriptors 106 may not have an entry for a spanning logical block that does not start in the physical block corresponding to header 100, in which case the skip length after table 104 value is needed. Logical block descriptors 106 may have additional information about the lengths of subsets of a logical blocks data when a logical block spans physical blocks including the partial size in this physical block, partial size of preceding data in other physical blocks and partial size of following data in other physical blocks. A variable-length encoding could be used to indicate the skip length after table 104 value, such as, for example, recording a single bit (e.g., 0: skip length after table value is zero; 1: remaining bits indicate the actual skip length after table 104 value).

Span physical block identifier 108 generally includes a value indicating whether the last logical block specified by logical block descriptors 106 is a spanning logical block and, when it is, the physical block into which it spans. In some examples, controller 32 may utilize a variable length code to represent the data for span physical block identifier 108. In one example, controller 32 uses a single bit value of "0" for span physical block identifier 108 to represent that no spanning occurs for the last logical block specified by logical block descriptors 106, a two-bit value "10" to represent that spanning occurs for the last logical block specified by logical block descriptors 106, and that the physical block into which data spans is the physical block immediately following the physical block corresponding to header 100, and a two-bit value "11" to represent that spanning occurs for the last logical block specified by logical block descriptors 108, plus an additional identifier of the physical block into which the data spans.

In some examples, the identifier of the physical block into which the data spans may comprise an additional variable length code. A first bit of the variable length code may represent whether the physical block into which the data spans is on the same flash die, and a second bit may represent whether the physical block into which the data spans is on the same erasure block when the first bit indicates that the physical block is on the same flash die. When the physical block into which the data spans is not on the same flash die, the second bit may not be included. Following these bits, controller 32 may explicitly define the location of the physical block into which the data spans. Table 1 below summarizes these example variable length codes:

TABLE 1

| Variable Length Code | Meaning |
| --- | --- |
| 0 | No spanning |
| 10 | Data spans into the next physical block |
| 1111 + physical_block_identifier | Data spans into the physical block identified by physical_block_identifier of the same erasure block |
| 1110 + erasure_block_identifier + physical_block_identifier | Data spans into the physical block identified by physical_block_identifier of erasure block identified by erasure_block_identifier of same flash die |
| 110 + flash_die_identifier + erasure_block_identifier + physical_block_identifier | Data spans into the physical block identified by physical_block_identifier of erasure block identified by erasure_block_identifier of flash die identified by flash_die_identifier |

Figure 6:
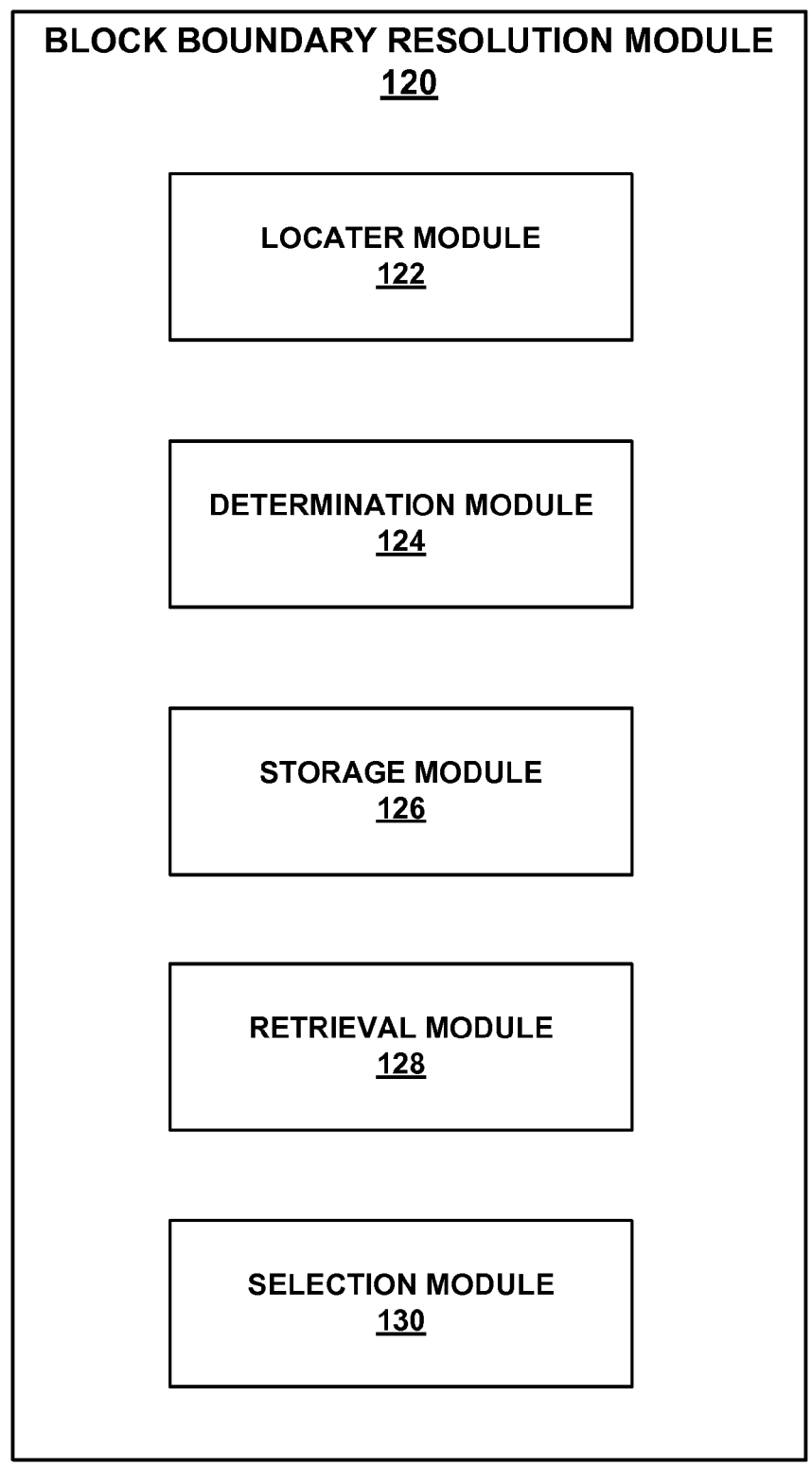
FIG. 6 is a block diagram illustrating a block boundary resolution module that may be implemented by a block access storage device.

FIG. 6 is a block diagram illustrating a block boundary resolution module 120 that may be implemented to perform block boundary resolution within a block access storage device, such as block access storage device 10 (FIG. 1), block access storage device 22 (FIG. 2), or SSD 30 (FIG. 3). For example, in some cases, block boundary resolution module 120 may be implemented to perform block boundary resolution 16 in block access storage device 10. In these cases, processors 12 of block access storage device 10 may implement the functionality of block boundary resolution module 120. In other cases, block boundary resolution module 120 may be implemented to perform block boundary resolution 26 in block access storage device 22, where processors 6 may implement the functionality of block boundary resolution module 120 in order to perform block boundary resolution 26 within storage devices 24.

As shown in the example of FIG. 6, block boundary resolution module 120 may include a locater module 122, a determination module 124, a storage module 126, a retrieval module 128, and a selection module 130. Locater module 122 may be configured to receive logical block addresses that are associated with a sequence of logical blocks. Locater module 122 may also locate a first portion of a logical block within a first physical block that is stored in a block access storage device (e.g., any of the block access storage devices shown in FIGS. 1-3) based upon a logical block address of the logical block, where the logical block is part of the sequence of logical blocks.

Determination module 124 may be configured to determine when the logical block is partitioned between the first physical block and a second, different physical block that is also stored in the block access storage device, where the first physical block and the second physical block are part of a progression of physical blocks assigned to the sequence of logical blocks. Determination module 124 may be further configured to determine when the logical block is partitioned between more than two physical blocks (e.g., when the logical block may comprise a "compression unit" of logical blocks that are compressed and included within such a "compression unit). Locater module 122 may then locate a second portion of the logical block within the second physical block. In this case, the data of the logical block may be thought of as "spanning" between the first physical block and the second physical block. The first and second physical blocks may be part of the same or different erasure blocks. Locater module 122 may be further configured to locate subsequent portions of the logical block within multiple different physical blocks when the logical block spans more than two physical blocks. Locater module 122 may be further configured to locate, within the second physical block, a location of another logical block in the sequence of logical blocks that is allocated after the second portion of the logical block.

Retrieval module 128 may be configured to retrieve, from the first physical block, the first portion of the logical block, and to retrieve, from the second physical block, the second portion of the logical block. Retrieval module 128 may be further configured to retrieve portions of the logical block from more than two physical blocks. Storage module 126 may be configured to store metadata identifying the second physical block as a next physical block for the logical block that is partitioned between the first physical block and the second physical block. In some examples, storage module 126 may be configured to store metadata within the second physical block that identifies the first physical block as a previous physical block for the logical block that is partitioned between the first physical block and the second physical block. Storage module 126 may be further configured to store metadata identifying the next physical block for the logical block that is partitioned between more than two physical blocks.

The metadata may, in some cases, explicitly identify the subsequent physical block, such as by address. In other cases, when the subsequent physical block is sequential to the preceding physical block within the address space of a particular erasure block, the metadata may simply identify the subsequent physical block by specifying that the next physical block (i.e., the second physical block) in the address space contains the remaining portion of the logical block.

In some cases, storage module 126 may be configured to store the metadata within the first physical block, such as shown in the example of FIG. 4A, when an individual physical block (e.g., page) contains a header having certain metadata information. The metadata may further identify any logical blocks within the sequence of logical blocks that are contained within page or physical block. In the example of FIG. 5, the metadata may include any of the information contained in header 100, such as header length 102, skip length after table 104, logical block descriptors 106, and span physical block identifier 108. In some cases, the metadata for various blocks, whether contained directly within the blocks or in external (e.g., table) information, may identify a next physical block in the progression of physical blocks for every physical block that is used by logical blocks within the sequence of logical blocks.

In one example, block boundary resolution module 120 may include a selection module, such as selection module 130 shown in FIG. 6. Selection module 130 may be configured to select the progression of physical blocks that are assigned to the sequence of logical blocks from a predefined group of selectable progressions that are available within the block access storage device.

In order to resolve block boundary issues, block boundary resolution module 120 may provide various functional characteristics. For example, block boundary resolution module 120 may specify a default progression in which physical blocks are assigned to a continuous sequence of logical blocks. In some instances, block boundary resolution module 120 may store and retrieve information specifying a progression of physical blocks if the progression used is not the primary default progression. Block boundary resolution module 120 may also locate logical blocks other than the first in a continuous sequence, particularly if these blocks have varying sizes or if they span across multiple different physical blocks.

In certain scenarios, block boundary resolution module 120 may implicitly use the default progression. In these scenarios, block boundary resolution module 120 may resolve block boundary issues by allowing logical blocks to span into the next physical block, where "next" is defined by the default progression. Any number of different default progressions may be implemented. For example, one default progression could sequentially utilize physical blocks within one particular erasure block in flash (e.g., within flash die 38 shown in FIG. 3).

In some cases, block boundary resolution module 120 may implicitly use the default progression with explicit exceptions for defects. In these cases, the physical block progression has special cases to deal with defects (which may, for example, result in one or more skipped physical blocks, such as skipped physical block 70 or 82 shown in FIG. 4A). Block boundaries may be resolved by recognizing an exceptional physical block progression specified by defect management, such as, for example, when supporting variable compression of data for logical blocks.

Block boundary resolution module 120 may also implicitly use the default progression with explicit exceptions for other optimizations (e.g., performance, power, reliability). In these scenarios, special cases are allowed to accommodate not only defects, but also physical block progressions with other advantages. A progression that utilizes a different, independent channel can improve performance through parallelism. A progression that utilizes a physical block or region of the medium with better error rates can improve data reliability.

Block boundary resolution module 120 may, however, also explicitly specify and use one of a set of deterministic progressions in some scenarios. These scenarios assume that there is more than one selectable physical block progression, one of which might be the primary default progression. The selection may be noted in a map that identifies at least the first of the physical blocks for a given logical block sequence.

Figure 7:
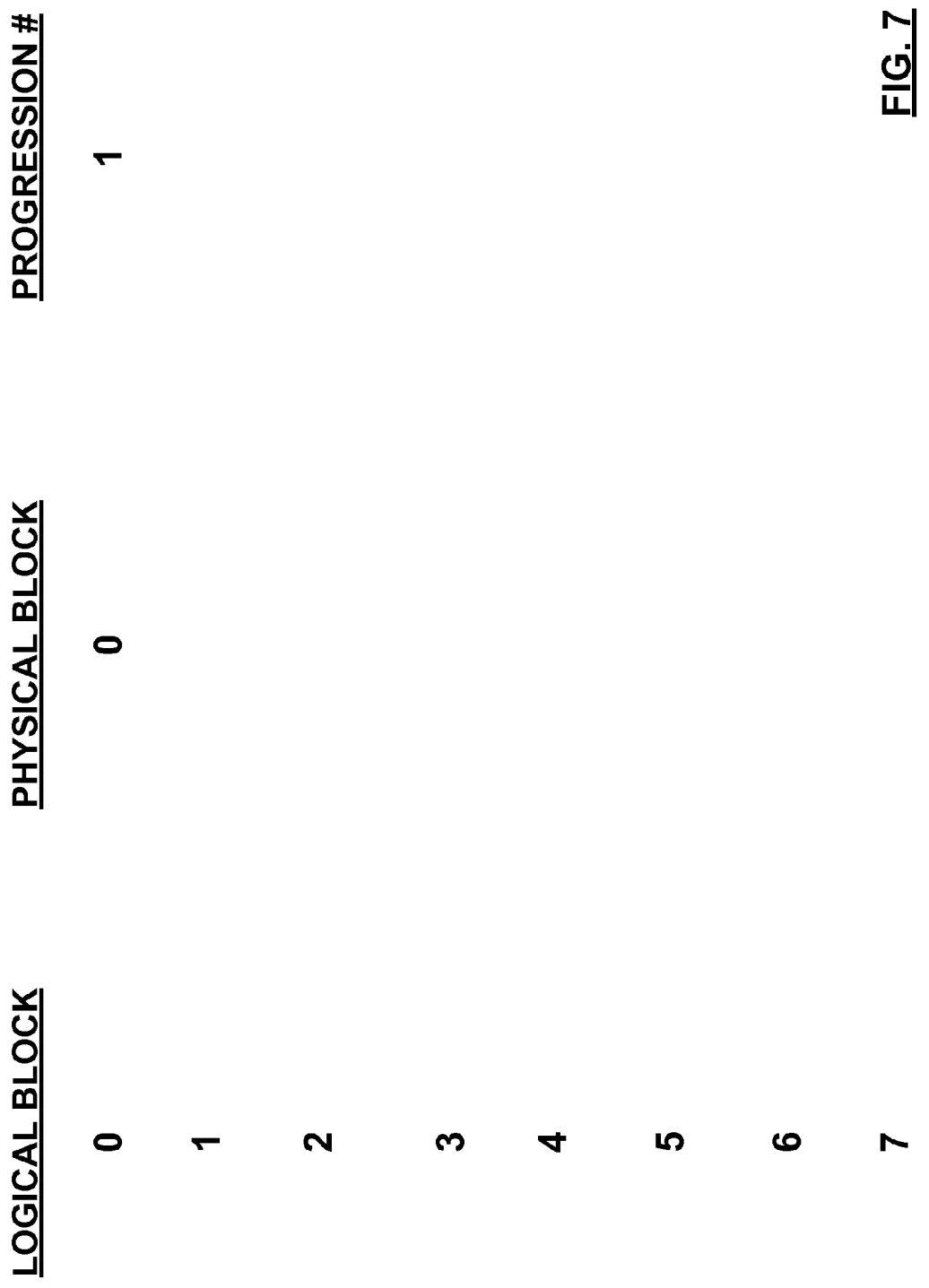
FIG. 7 is a diagram illustrating an example of a map that specifies a progression of physical blocks that are to be assigned to a sequence of logical blocks.
Figure 8:
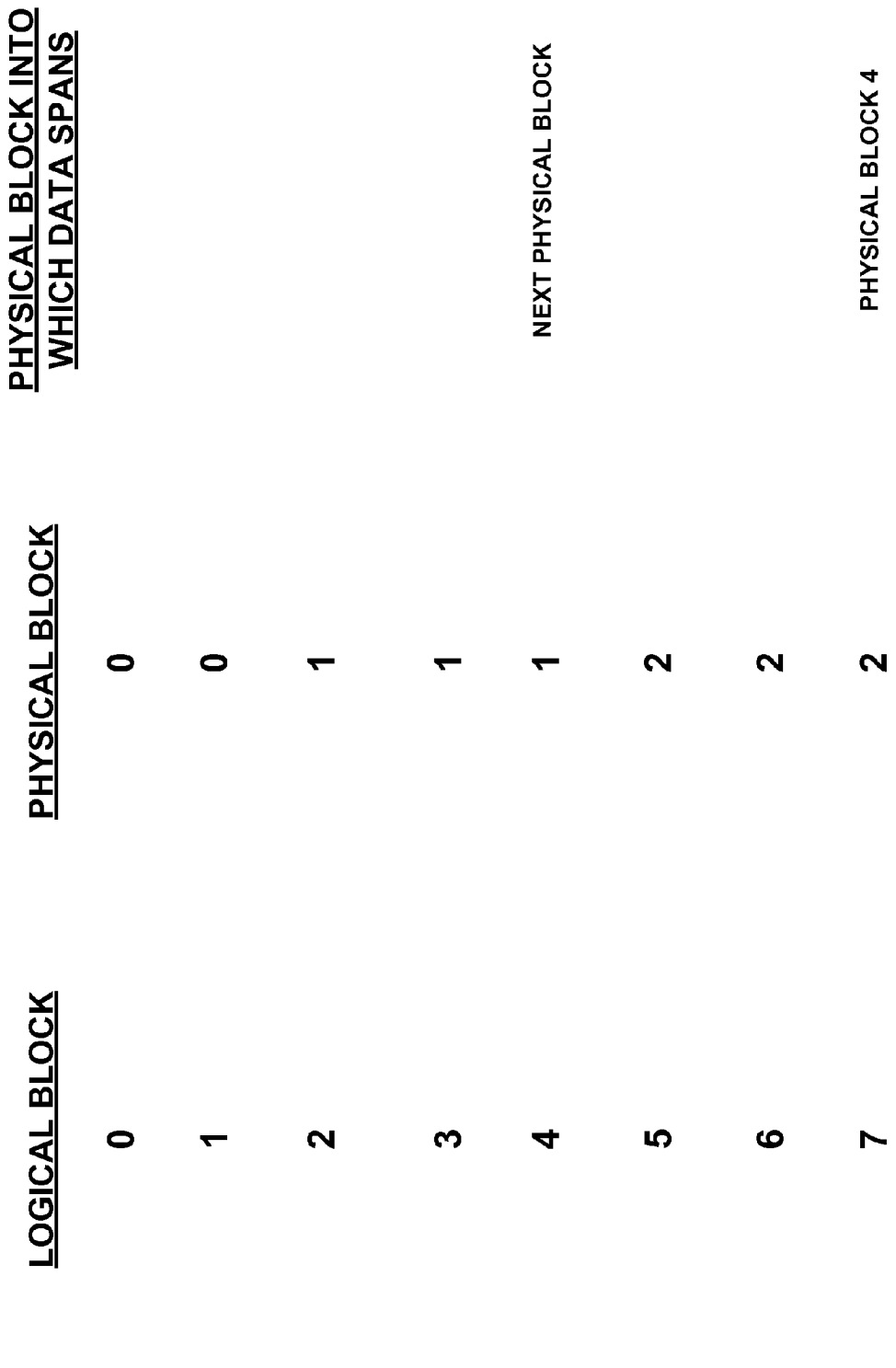
FIG. 8 is a diagram illustrating an example of a map that specifies a next physical block in a progression when a logical block is partitioned between multiple physical blocks.

For example, FIG. 7 is a diagram illustrating an example of a map that specifies a progression of physical blocks that are to be assigned to a sequence of logical blocks. In this example, the sequence of logical blocks corresponds to logical blocks 0-7. (The logical-to-physical block maps that are shown in the examples of FIGS. 7-9, which may comprise lookup tables, may be stored within one or more of the storage devices (e.g., storage devices 14 or 24) of the block access storage device (e.g., block access storage device 10 or 22), or may even be, in some instances, stored within one or more of the storage devices of the computing device (e.g., computing device 4). In addition, the logical block identifiers and physical block identifiers shown in these figures (e.g., logical blocks 0-7) may correspond to logical and physical block addresses, respectively.)

As shown in the example of FIG. 7, the map indicates that physical block 0 of a particular erasure block is the first physical block assigned to the sequence of logical blocks 0-7, and is particularly mapped to logical block 0. In addition, the map of FIG. 7 indicates that physical block 0 is the first physical block in the explicitly selected progression of physical blocks (in this example, progression #1) that is assigned to the sequence of logical blocks 0-7. Progression #1 may specify the order in which physical blocks are assigned to the sequence of logical blocks 0-7, and may comprise one of many different selectable progressions.

In other scenarios, block boundary resolution module 120 may explicitly specify the next physical block either for every physical block used by a logical block sequence, or at least whenever a logical block spans a physical block boundary. In these scenarios, explicit information is stored to specify the physical block progression.

For example, FIG. 8 is a diagram illustrating an example of a map that specifies a next physical block in a progression when a logical block is partitioned between multiple physical blocks. (The sizes of the logical blocks in FIG. 8 need not necessarily be the same, and, in many instances, may not be the same.)

In this example, where the logical block sequence includes logical blocks 0-7, the map specifies a physical block that is assigned as the starting physical block for each of the logical blocks 0-7. (Thus, logical block 0 starts in physical block 0, logical block 1 starts in physical block 0, logical blocks 2-4 each start in physical block 1, and logical blocks 5-7 each start in physical block 2. Physical blocks 0, 1, and 2 are part of the same erasure block in this example, although the physical blocks of any particular progression may be included within one or more erasure blocks.)

It is assumed in the example of FIG. 8 that logical block 4 spans physical block 1 and physical block 2, assuming that physical block 2 is the next physical block after physical block 1 in the progression of this particular example. As a result, logical block 4 begins in physical block 1 but ends in physical block 2, thereby being partitioned between physical blocks 1 and 2. For the row in the map corresponding to logical block 4 shown in FIG. 8, within the column entitled "physical block into which data spans," the entry of "next physical block" indicates that logical block 4 spans into the next physical block after physical block 1 within the progression that is assigned to the sequence of logical blocks 0-7. In this example, it is assumed that the progression provides a sequential ordering of physical blocks within one erasure block, such that physical block 2 is next in the sequence after physical block 1 within the progression.

Entries within the column entitled "physical block into which data spans" may also explicitly identify the next physical block when a logical block spans between different physical blocks. Thus, in FIG. 8, the entry "physical block 4" in this column corresponding to the row for logical block 7 indicates that logical block 7 spans physical block 2 into physical block 4. Logical block 7 is therefore partitioned between physical blocks 2 and 4, such that logical block 7 begins in physical block 2 but ends in physical block 4. From the information contained in the column entitled "physical block into which data spans" in FIG. 8, the map provides the information to determine whether a logical block spans multiple physical blocks, and, if so, to further identify the next physical block, either indirectly (e.g., "next physical block") or directly (e.g., "physical block 4").

FIG. 9 is a diagram illustrating an example of a map that specifies a next physical block for each physical block in a progression that is assigned to a sequence of logical blocks. In FIG. 9, the assignment of physical blocks to the sequence of logical blocks 0-7 is the same as in the example of FIG. 8. Thus, logical block 0 starts in physical block 0, logical block 1 starts in physical block 0, logical blocks 2-4 each start in physical block 1, and logical blocks 5-7 each start in physical block 2.

However, the example map shown in FIG. 9 differs from the map of FIG. 8 in that an explicit identifier for the next physical block for each logical block in the sequence is included within the column entitled "next physical block" in the map table of FIG. 9. Thus, for every logical block 0-7, the map of FIG. 9 specifies the physical block in which the corresponding logical block begins, as well as the next physical block in the progression of physical blocks that are assigned to the sequence of logical blocks 0-7. When multiple logical blocks fit within a given physical block, the "physical block" and "next physical block" entries within the map may be the same for a given logical block. For example, for the row corresponding to logical block 0 in FIG. 9, because physical block 0 contains both logical block 0 and logical block 1, the "physical block" and "next physical block" entries are both equal to physical block 0.

When logical blocks span across multiple physical blocks in the progression, the map of FIG. 9 provides the information to identify pertinent physical blocks. For example, if logical block 4 is partitioned between multiple physical blocks, the map of FIG. 9 indicates that logical block 4 starts in physical block 1 but ends in physical block 2 (which is the next physical block in the progression). Similarly, if logical block 7 spans across multiple physical blocks, the map of FIG. 9 indicates that logical block 7 starts in physical block 2 but ends in physical block 3.

In various examples, such as the one shown in FIG. 4A, information concerning the next physical block within a progression assigned to a logical block sequence may be specified by metadata that is embedded within each physical block, such as within a header, rather than within a separate table. In these examples, at least the first logical block of a sequence may be located by a higher-level map that identifies a physical block corresponding to that logical block. From there, the physical block progression can be followed by using the embedded information within the physical blocks, similar to the concept of linked list traversal in memory design.

Finding the start of a logical block within a logical block sequence may be straightforward when the amount of data stored within each logical block is the same or when the logical-to-physical block mapping is complete for every logical block (such as in the example of FIG. 9). When stored data sizes vary, such as may be the case with compressed data, and the mapping locates only the first of a sequence of logical blocks, block boundary resolution module 120 (FIG. 6) may search for a desired logical block in the sequence using the physical block progression. If the progression uses some default sequence then, with information about the average compression rate (as one example), a first estimate can be made with respect to the physical block that may contain the desired logical block.

In these instances, the physical blocks may each include embedded information or metadata specifying the addresses of the logical blocks stored therein. Other embedded information or metadata may also be included, such as a specification of the compression method, compression metadata such as a dictionary, the next physical block in the sequence, and even the previous physical block in the sequence. If the first estimate of a physical block is wrong, then a next or a previous physical block can be searched (similar to the concept of linked list traversal in memory design) until the desired logical block is found within one of the physical blocks in the progression.

Figure 10:
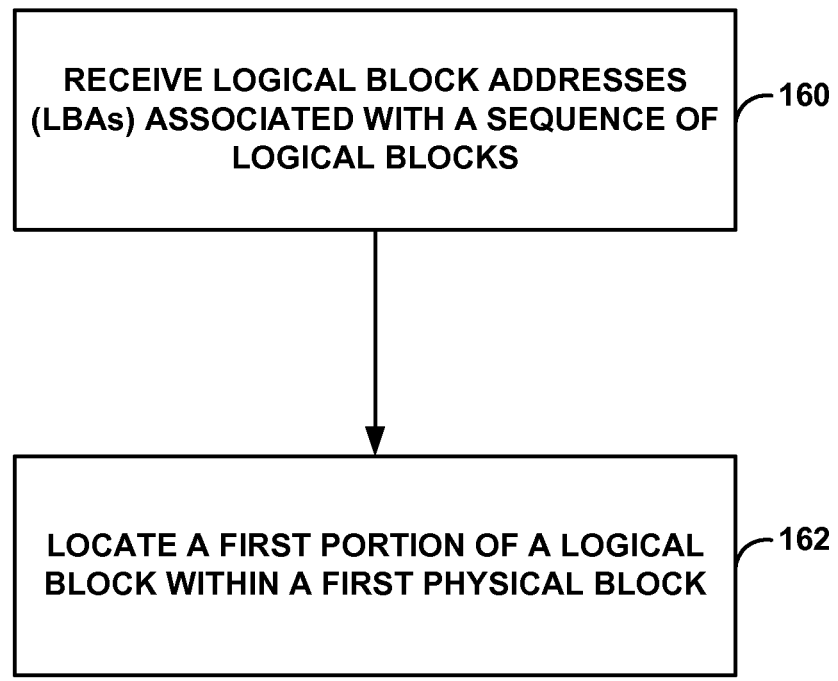
FIG. 10 is a flow diagram illustrating an example method that may be performed by a block access storage device.

FIG. 10 is a flow diagram illustrating an example method that may be performed by a block access storage device, such as any of the block access storage devices shown in FIGS. 1-3. As shown in FIG. 6, block boundary resolution module 120 may include various components, such as locater module 122, determination module 124, storage module 126, retrieval module 128, and selection module 130. Each of the modules within block boundary resolution module 120 may be configured in one or more processors to perform various acts, such as the ones shown in the flow diagram of FIG. 10.

Locater module 122 may receive logical block addresses that are associated with a sequence of logical blocks (160), and may locate a first portion (e.g., beginning) of a logical block within a first physical block that is stored in a block access storage device (e.g., solid-state drive 30) based upon a logical block address of the logical block, the logical block being part of the sequence of logical blocks (162). At least two logical blocks within the sequence of logical blocks may have different sizes. The logical blocks may have different sizes due to various processing and/or transformations performed by a block access storage device (e.g., encoding, adding redundancy, grouping, compressing). In some examples, the logical block may be completely included within the first physical block.

In one aspect, determination module 124 may determine that the logical block is partitioned between the first physical block and subsequent, different physical blocks that are also stored in the block access storage, the first physical block and the subsequent physical blocks being part of a progression of physical blocks assigned to the sequence of logical blocks. Locater module 122 may also locate subsequent portions of the logical block within the subsequent physical blocks.

In one aspect, determination module 124 may determine that the logical block is partitioned between the first physical block and a second, different physical block that is also stored in the block access storage device, where the first physical block and the second physical block are part of a progression of physical blocks assigned to the sequence of logical blocks. Locater module 122 may also locate a second portion of the logical block within the second physical block.

The block access storage device may comprise a solid-state drive, such as SSD 30 shown in FIG. 3. The first physical block and the second physical block may be part of one erasure block, but also may be part of multiple erasure blocks. Retrieval module 128 may retrieve, from the first physical block, the first portion of the logical block, and retrieve, from the second physical block, the second portion of the logical block. Locater module 122 may locate, within the second physical block, a location of another logical block in the sequence of logical blocks that is allocated after the second portion of the logical block.

Storage module 126 may store metadata identifying the second physical block as a next physical block for the logical block that is partitioned between the first physical block and the second physical block. In some cases, the metadata explicitly identifies the second physical block. In some cases, storage module 126 is configured to store the metadata within the first physical block. The metadata may identify any logical blocks within the sequence of logical blocks that are contained within the first physical block. The metadata may further identify a next physical block in the progression of physical blocks for every physical block that is used by logical blocks within the sequence of logical blocks.

Storage module 126 may be configured to store metadata within the second physical block that identifies the first physical block as a previous physical block for the logical block that is partitioned between the first physical block and the second physical block. In some cases, selection module 130 may be configured to select the progression of physical blocks that are assigned to the sequence of logical blocks from a predefined group of selectable progressions.

The techniques described in this disclosure may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware, or any combination thereof. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-media applications and devices. In some aspects, for example, such components may form part of a mobile device, such as a wireless communication device handset.

If implemented in software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

The invention claimed is:

1. A method comprising:
    associating logical block addresses with a sequence of logical blocks, wherein at least two logical blocks within the sequence of logical blocks have different sizes;
    storing the sequence of logical blocks within a first physical block of a solid-state drive;
    storing mapping data in a lookup table that maps individual logical blocks of the sequence of logical blocks to the first physical block; and
    storing a header that identifies where the individual logical blocks are located in the first physical block, wherein the header is stored at the beginning of the first physical block before the sequence of logical blocks, and wherein locating the individual logical blocks comprises identifying the first physical block via the lookup table and determining a location of the individual logical blocks within the first physical block via the header.

2. The method of claim 1, further comprising:
    determining via the header that a logical block of the sequence of logical blocks is partitioned between the first physical block and a second, different physical block of the solid-state drive, the first physical block and the second physical block being part of a progression of physical blocks assigned to the sequence of logical blocks; and
    locating a second portion of the logical block via a second header of the second physical block.

3. The method of claim 2, wherein the first physical block and the second physical block are part of one erasure block in the solid-state drive.

4. The method of claim 2, further comprising:
retrieving, from the first physical block, the first portion of the logical block; and
retrieving, from the second physical block, the second portion of the logical block.

5. The method of claim 2, further comprising locating, within the second header of the second physical block, a location of another logical block in the sequence of logical blocks that is allocated after the second portion of the logical block.

6. The method of claim 2, further comprising storing metadata identifying the second physical block as a next physical block for the logical block that is partitioned between the first physical block and the second physical block.

7. The method of claim 6, wherein the metadata explicitly identifies the second physical block.

8. The method of claim 6, wherein the metadata further identifies a next physical block in the progression of physical blocks for every physical block that is used by logical blocks within the sequence of logical blocks.

9. The method of claim 2, further comprising storing metadata within the second header of the second physical block that identifies the first physical block as a previous physical block for the logical block that is partitioned between the first physical block and the second physical block.

10. The method of claim 2, further comprising selecting the progression of physical blocks that are assigned to the sequence of logical blocks from a predefined group of selectable progressions.

11. The method of claim 2, wherein the header comprises a variable length code that indicates the first physical block and the second physical block are part of different erasure blocks of the solid-state drive, and wherein the header includes an indicator of at least one of the different erasure blocks.

12. The method of claim 2, wherein the header comprises a variable length code that indicates the first physical block and the second physical block are part of different flash dies of the solid-state drive, and wherein the header includes an indicator of at least one of the different flash dies.

13. The method of claim 1, wherein the header comprises a list of logical block addresses and lengths associated with the sequence of logical blocks.

14. The method of claim 1, wherein the header comprises a skip length that indicates a starting point of the sequence of logical blocks, wherein the starting point is after a partial logical block stored after the header of the first physical block, the partial logical block being associated with another physical block.

15. The method of claim 1, wherein the header comprises a span physical block identifier comprising:
an indicator that a last logical block of the sequence of logical blocks is a spanning logical block; and
an indicator of a second physical block into which the last logical block spans.

16. The method of claim 1, further comprising adding padding to the first physical block after the sequence of logical blocks, the padding representing a portion of the physical block that is unused.

17. The method of claim 16, wherein the padding indicates that a controller has determined not to utilize the first physical block to span logical blocks.

18. A non-transitory computer-readable storage medium comprising executable instructions that cause one or more processors to:
associate logical block addresses with a sequence of logical blocks, wherein at least two logical blocks within the sequence of logical blocks have different sizes;
store the sequence of logical blocks within a first physical block of a solid-state drive;
store mapping data in a lookup table that maps individual logical blocks of the sequence of logical blocks to the first physical block;
store a header that identifies where in the first physical block the individual logical blocks are located, wherein the header is stored at the beginning of the first physical block before the sequence of logical blocks, and wherein locating the individual logical blocks comprises identifying the first physical block via the lookup table and determining a location of the individual logical blocks within the first physical block via the header.

19. A device comprising:
one or more hardware processors capable of being coupled to a solid-state drive, the one or more processors configured to:
associate logical block addresses with a sequence of logical blocks, wherein at least two logical blocks within the sequence of logical blocks have different sizes;
store the sequence of logical blocks within a first physical block of the solid-state drive;
store mapping data in a lookup table that maps individual logical blocks of the sequence of logical blocks to the first physical block; and
store a header that identifies where in the first physical block the individual logical blocks are located, wherein the header is stored at the beginning of the first physical block before the sequence of logical blocks, and wherein locating the individual logical blocks comprises identifying the first physical block via the lookup table and determining a location of the individual logical blocks within the first physical block via the header.

20. The device of claim 19, further comprising:
wherein the one or more processors are configured to determine via the header that a logical block of the sequence of logical blocks is partitioned between the first physical block and a second, different physical block of the solid-state drive, the first physical block and the second physical block being part of a progression of physical blocks assigned to the sequence of logical blocks, wherein the one or more processors are further configured to locate a second portion of the logical block via a second header of the second physical block.

21. The device of claim 20, wherein the first physical block and the second physical block are part of one erasure block in the solid-state drive.

22. The device of claim 20, wherein the one or more processors are configured to retrieve, from the first physical block, the first portion of the logical block, and to retrieve, from the second physical block, the second portion of the logical block.

23. The device of claim 20, wherein the one or more processors are further configured to locate, within the second header of the second physical block, a location of another logical block in the sequence of logical blocks that is allocated after the second portion of the logical block.

24. The device of claim 20, wherein the one or more processors are configured to store metadata identifying the second physical block as a next physical block for the logical block that is partitioned between the first physical block and the second physical block.

25. The device of claim 24, wherein the metadata explicitly identifies the second physical block.

26. The device of claim 24, wherein the metadata further identifies a next physical block in the progression of physical blocks for every physical block that is used by logical blocks within the sequence of logical blocks.

27. The device of claim 20, wherein the one or more processors are configured to store metadata within the second header of the second physical block that identifies the first physical block as a previous physical block for the logical block that is partitioned between the first physical block and the second physical block.

28. The device of claim 20, wherein the one or more processors are configured to select the progression of physical blocks that are assigned to the sequence of logical blocks from a predefined group of selectable progressions.

29. The device of claim 20, wherein the header comprises a variable length code that indicates the first physical block and the second physical block are part of different erasure blocks of the solid-state drive, and wherein the header includes an indicator of at least one of the different erasure blocks.

30. The device of claim 20, wherein the header comprises a variable length code that indicates the first physical block and the second physical block are part of different flash dies of the solid-state drive, and wherein the header includes an indicator of at least one of the different flash dies.

31. The device of claim 20, wherein the one or more processors are configured to add padding to the first physical block after the sequence of logical blocks, the padding representing a portion of the physical block that is unused.

32. The method of claim 31, wherein the padding indicates that the one or more processors have determined not to utilize the first physical block to span logical blocks.

* * * * *